(12) United States Patent
Roth et al.

(10) Patent No.: US 6,760,800 B1
(45) Date of Patent: Jul. 6, 2004

(54) EVENT VECTOR TABLE OVERRIDE

(75) Inventors: Charles P. Roth, Austin, TX (US); Ravi Kolagotla, Austin, TX (US); Jose Fridman, Brookline, MA (US)

(73) Assignees: Intel Corporation, Santa Clara, CA (US); Analog Devices, Inc., Norwood, MA (US)

(*) Notice: Subject to any disclaimer, the term of this patent is extended or adjusted under 35 U.S.C. 154(b) by 478 days.

(21) Appl. No.: 09/672,289

(22) Filed: Sep. 28, 2000

(51) Int. Cl.[7] ............................................. G06F 13/24
(52) U.S. Cl. ........................ 710/260; 261/268; 261/50
(58) Field of Search .............................. 710/48, 49, 50, 710/260, 261, 262, 264, 265, 266, 269; 709/100, 318

(56) References Cited

U.S. PATENT DOCUMENTS 5,943,507 A * 8/1999 Cornish et al. ............... 710/48

6,148,321 A * 11/2000 Hammond ................... 709/100

FOREIGN PATENT DOCUMENTS

| EP | 0 786 726 | 7/1997 |
| EP | 0 992 902 | 4/2000 |

* cited by examiner

*Primary Examiner*—Khanh Dang
(74) *Attorney, Agent, or Firm*—Fish & Richardson P.C.

(57) ABSTRACT

In an embodiment, a system may include a processor that handles a number of events. These events may include general purpose interrupts (GPIs) assigned to particular devices in the system. Addresses for event service routines appropriate for particular events may be stored in an event vector table (EVT). In a system with a number of devices that utilize the processor's resources, some interrupts may be overloaded, that is, assigned to more than one device. If an overloaded interrupt occurs, the processor may override the EVT entry and select an address supplied by a system controller at a set of reset vector pins.

27 Claims, 6 Drawing Sheets

EVENT VECTOR TABLE OVERRIDE

TECHNICAL FIELD

This invention relates to pipelined processors, and more particularly to overloading interrupts in pipelined processors.

BACKGROUND

Digital signal processing is concerned with the representation of signals in digital form and the transformation or processing of such signal representation using numerical computation. Digital signal processing is a widely used technology for many of today's high technology products in fields such as wireless communications, networking, and multimedia. One reason for the prevalence of digital signal processing technology has been the development of low cost, powerful digital signal processors (DSPs) that provide the reliable computing capability to implement these products cheaply and efficiently. Since the development of the first DSPs, DSP architecture and design have evolved to the point where even sophisticated real-time processing of video-rate sequences may be performed.

DSPs are often used for a variety of multimedia applications such as digital video, imaging, and audio. DSPs may manipulate the digital signals to create and open such multimedia files.

MPEG-1 (Motion Picture Expert Group), MPEG-2, MPEG-4 and H.263 are digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

DESCRIPTION OF DRAWINGS

These and other features and advantages of the invention will become more apparent upon reading the following detailed description and upon reference to the accompanying drawings.

DETAILED DESCRIPTION

Figure 1:
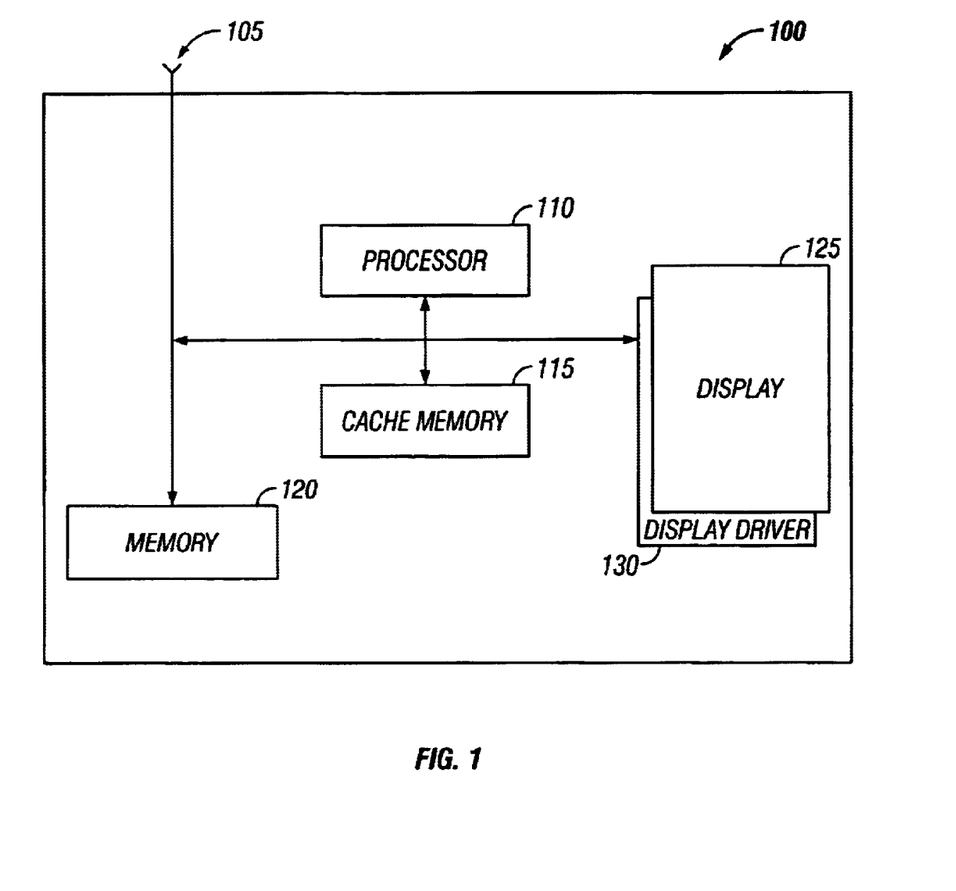
FIG. 1 is a block diagram of a mobile video device utilizing a processor according to an embodiment.

FIG. 1 illustrates a mobile video device 100 including a processor according to an embodiment of the invention. The mobile video device 100 may be a hand-held device which displays video images produced from an encoded video signal received from an antenna 105 or a digital video storage medium 120, e.g., a digital video disc (DVD) or a memory card. A processor 110 communicates with a cache memory 115 which may store instructions and data for the processor operations. The processor 110 may be a microprocessor, a digital signal processor (DSP), a microprocessor controlling a slave DSP, or a processor with a hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, a pipelined DSP 110 may fetch the second instruction concurrently with execution of the first instruction, thereby improving instruction throughput. Further, the clock cycle of a pipelined DSP may be shorter than that of a non-pipelined DSP, in which the instruction is fetched and executed in the same clock cycle.

Such a DSP 110 may be used with in video camcorders, teleconferencing, PC video cards, and High-Definition Television (HDTV). In addition, the DSP 110 may also be used in connection with other technologies utilizing digital signal processing such as voice processing used in mobile telephony, speech recognition, and other applications.

Figure 2:
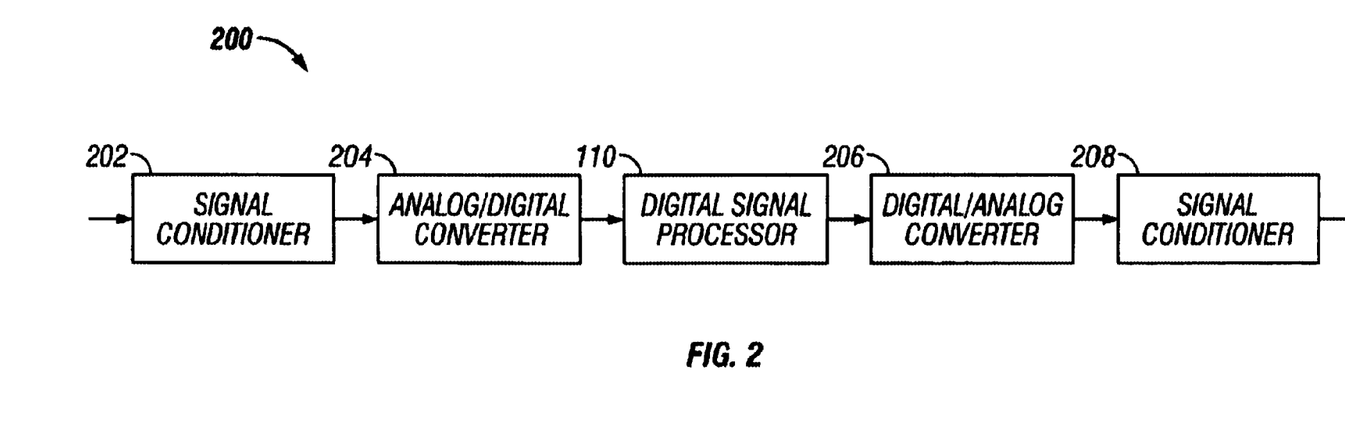
FIG. 2 is a block diagram of a signal processing system according to an embodiment.

FIG. 2 shows a block diagram of a signal processing system 200 including DSP 110 according to an embodiment is shown. One or more analog signals may be provided by an external source, e.g., antenna 105, to a signal conditioner 202. Signal conditioner 202 may perform certain preprocessing functions upon the analog signals. Exemplary preprocessing functions may include mixing several of the analog signals together, filtering, amplifying, etc. An analog-to-digital converter (ADC) 204 may be coupled to receive the preprocessed analog signals from signal conditioner 202 and to convert the preprocessed analog signals to digital signals consisting of samples, as described above. The samples may be taken according to a sampling rate determined by the nature of the analog signals received by signal conditioner 202. The DSP 110 is coupled to receive digital signals at the output of the ADC 204. The DSP 110 may perform the desired signal transformation upon the received digital signals, producing one or more output digital signals. A digital-to-analog converter (DAC) 206 is coupled to receive the output digital signals from the DSP 110. The DAC 206 converts the output digital signals into output analog signals. The output analog signals may then be conveyed to another signal conditioner 208. The signal conditioner 208 may perform post-processing functions upon the output analog signals. Exemplary post-processing functions are similar to the preprocessing functions listed above. Any suitable arrangement of these devices may be coupled into a signal processing system 200 with the DSP 110.

Figure 3:
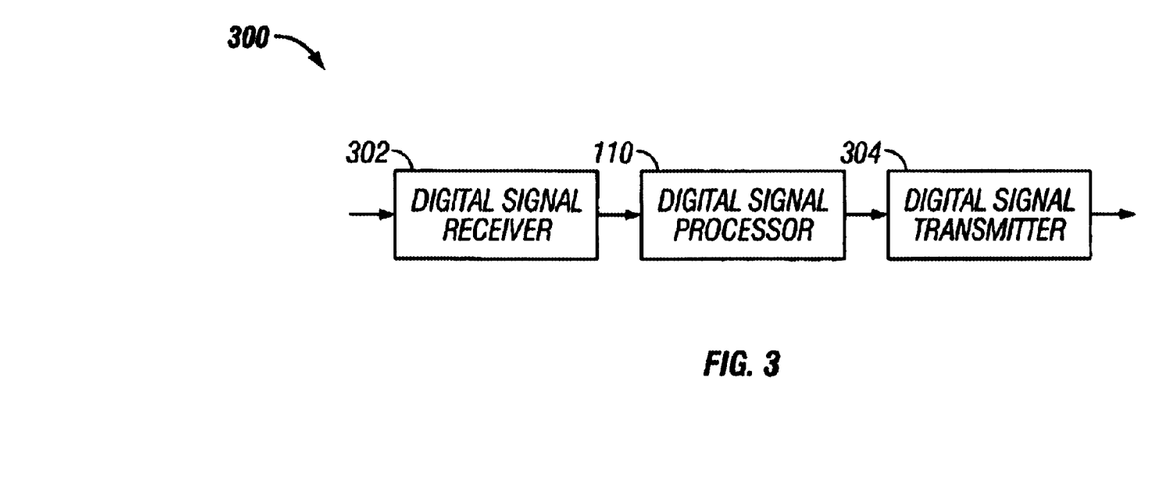
FIG. 3 is a block diagram of an alternative signal processing system according. to an embodiment.

Turning next to FIG. 3, a signal processing system 300 according to another embodiment is shown. In this embodiment, a digital receiver 302 may be arranged to receive one or more digital signals and to convey the received digital signals to the DSP 110. As with the embodiment shown in FIG. 2, DSP 110 may perform the desired signal transformation upon the received digital signals to produce one or more output digital signals, Coupled to receive the output digital signals may be a digital signal transmitter 304. In one exemplary application, the signal processing system 300 may be a digital audio device in which the digital receiver 302 conveys to the DSP 110 digital signals indicative of data stored on the digital storage device 120. The DSP 110 may then processes the digital signals and convey the resulting output digital signals to the digital transmitter 304. The digital transmitter 304 may then cause values of the output digital signals to be transmitted to the display driver 130 to produce a video image on the display 125.

Figure 4:
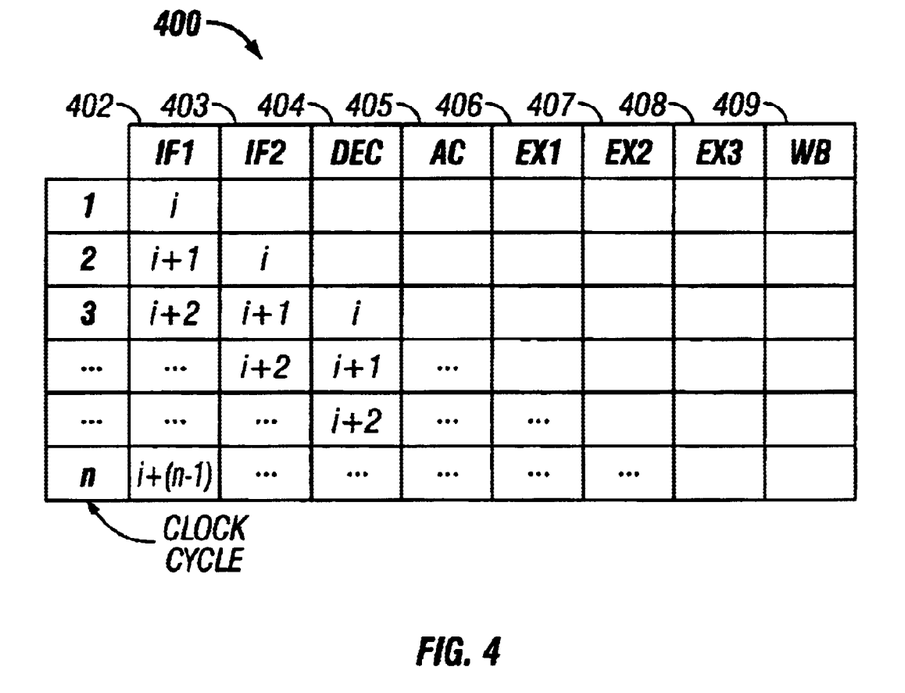
FIG. 4 illustrates exemplary pipeline stages of the processor in FIG. 1 according to an embodiment.

The pipeline illustrated in FIG. 4 may include eight stages, which may include instruction fetch 402–403, decode 404, address calculation 405, execution 406–408, and write-back 409 stages. An instruction i may be fetched in one clock cycle and then operated on and executed in the pipeline in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations that cause a conditional branch to be taken or an exception or interrupt to be generated may alter the sequential flow of instructions. After such an occurrence, a new instruction may be fetched outside of the sequential program flow, making the remaining instructions in the pipeline irrelevant. Methods such as data forwarding, branch prediction, and associating valid bits with instruction addresses in the pipeline may be employed to deal with these complexities.

Figure 5:
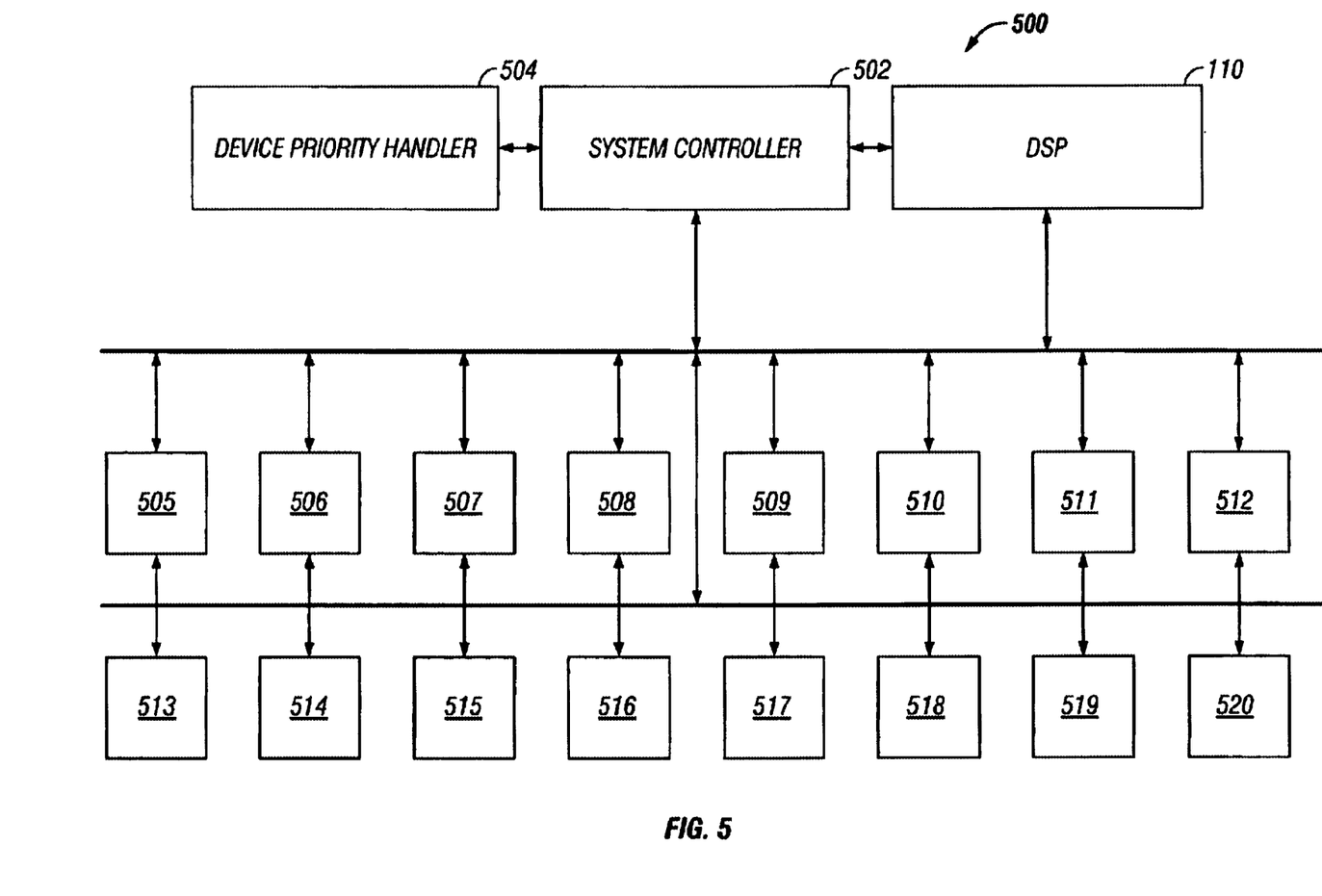
FIG. 5 is a block diagram of a system including the processor in FIG. 1 according to an embodiment.

FIG. 5 illustrates a system 500 including a system controller 502 that may control the DSP 110 and a number of other devices 505–520 that may communicate with the DSP 110. Devices 505–520 may include, for example, a microprocessor or a peripheral component interconnect (PCI) controller.

Program flow in the DSP 110 may be interrupted by certain events. These events may include interrupts initiated by the devices 505–520 in the system that require servicing by the DSP 110. These events may also include interrupt-like events utilized by the system, such as emulation and reset. When the system commits to an event, the instructions in the pipeline may be killed, and a set of instructions for an event service routine appropriate for that event may be fetched and introduced into the pipeline.

These events may have different priorities. According to an embodiment, emulation may have a higher priority than reset, and reset may have a higher priority than interrupts raised by the devices 505–520. The interrupts may include general purpose interrupts (GPIs) that may be assigned to different devices 505–520 in the system 500, unlike the emulation and reset events, which may be fixed. The GPIs may provide flexibility in the design of systems utilizing the DSP 110. The GPIs may also have different priorities, thus giving certain devices priority over other devices in the system 500.

Figure 6:
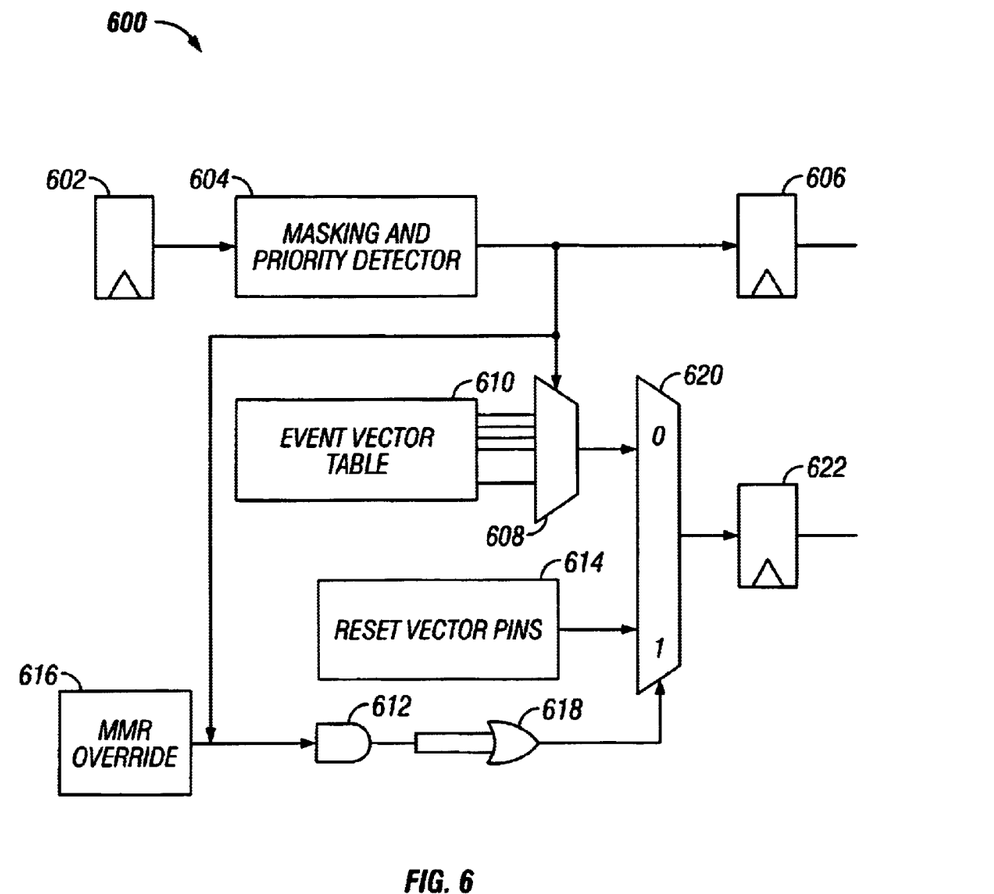
FIG. 6 is a block diagram of a circuit for overriding an event vector table according to an embodiment.

FIG. 6 illustrates a circuit 600 according to an embodiment that may handle interrupts in a system 500 in which the same GPI is assigned to two or more devices. The DSP 110 may recognize sixteen events with different priorities. Events occurring in a given cycle may be identified by a 16-bit event word output from a latch 602. The type of event may be represented by a particular bit in the 16-bit word. For example, event one, which may have the second highest priority, may be represented by bit one in the event word. According to an embodiment, event one may be assigned to reset. Events seven to fifteen, which may be reserved for GPIs, may be represented by bits seven to fifteen, respectively, in the event word.

The event word may be input to a masking and priority detection (MPD) circuit 604. The MDP circuit 604 may mask out certain interrupts based on system parameters and resolve priority between different events occurring in the same cycle. The MPD circuit 604 may output a new 16-bit event word identifying an unmasked, priority event to a latch 606, a multiplexer (MUX) 608 connected to an event vector table (EVT) 610, and an AND gate 612.

The EVT 610 may include entries for events two to fifteen. The entries may include the address of the first instruction in an event service routine corresponding to that particular event number.

The addresses in the entries for events two to fifteen may be written to the EVT 610. When the DSP 110 is powered on, the addresses in the EVT 610 may be altered, and hence unreliable. Reset may be performed each time the DSP 110 is powered on. To ensure that the address for the reset service routine is accurate, the address for the first instruction in the reset service routine may not be stored in the EVT 610. Rather, the address may be provided via thirty-two reset vector pins 614 in the DSP 110. The reset service routine may include writing the event service routine addresses to the EVT.

As described above, events seven to fifteen may be allocated for GPIs. In a system with nine devices vying for DSP 110 resources, the device may be assigned a different GPI. However, in a system 500 with more than nine devices, some GPIs may be assigned to more than one device. These GPIs may be considered overloaded.

According to an embodiment, EVT entries for overloaded GPIs may be overridden. Rather than using the address in the EVT entry for the GPI, an address for the event service routine appropriate for the particular device may be supplied at the reset vector pins by the system controller 502.

For example, six devices 505–510 may be assigned to event thirteen. These devices may require a different event service routine. In this example, the address stored in the EVT at entry thirteen may not be appropriate for at least five of the devices 505–510. According to an embodiment, when one of the devices 505–510 requests an interrupt, the EVT 610 may be overridden and the appropriate address provided by the system controller 502 at the reset vector pins 614.

If more than one of these devices 505–510 requests an interrupt in a cycle, e.g., 505 and 506, a device priority handler 504 may resolve priority between the two devices 505, 506 and transmit the result to the system controller 502. The system controller 502 may then provide the address corresponding to the device that wins priority at the reset vector pins 614.

Overloaded GPIs may be identified by an n-bit override word in an EVT override register 616. The value of n may correspond to the number of GPIs. The bits in the n-bit word may correspond to a particular event number. Bits corresponding to overloaded GPIs may be set HIGH and the other bits set LOW.

Both the EVT 610 and the EVT override register 616 may be memory map registers (MMRs). In an MMR, a store operation to a given address may map directly to register(s) in the MMR rather than a memory location.

Figure 7:
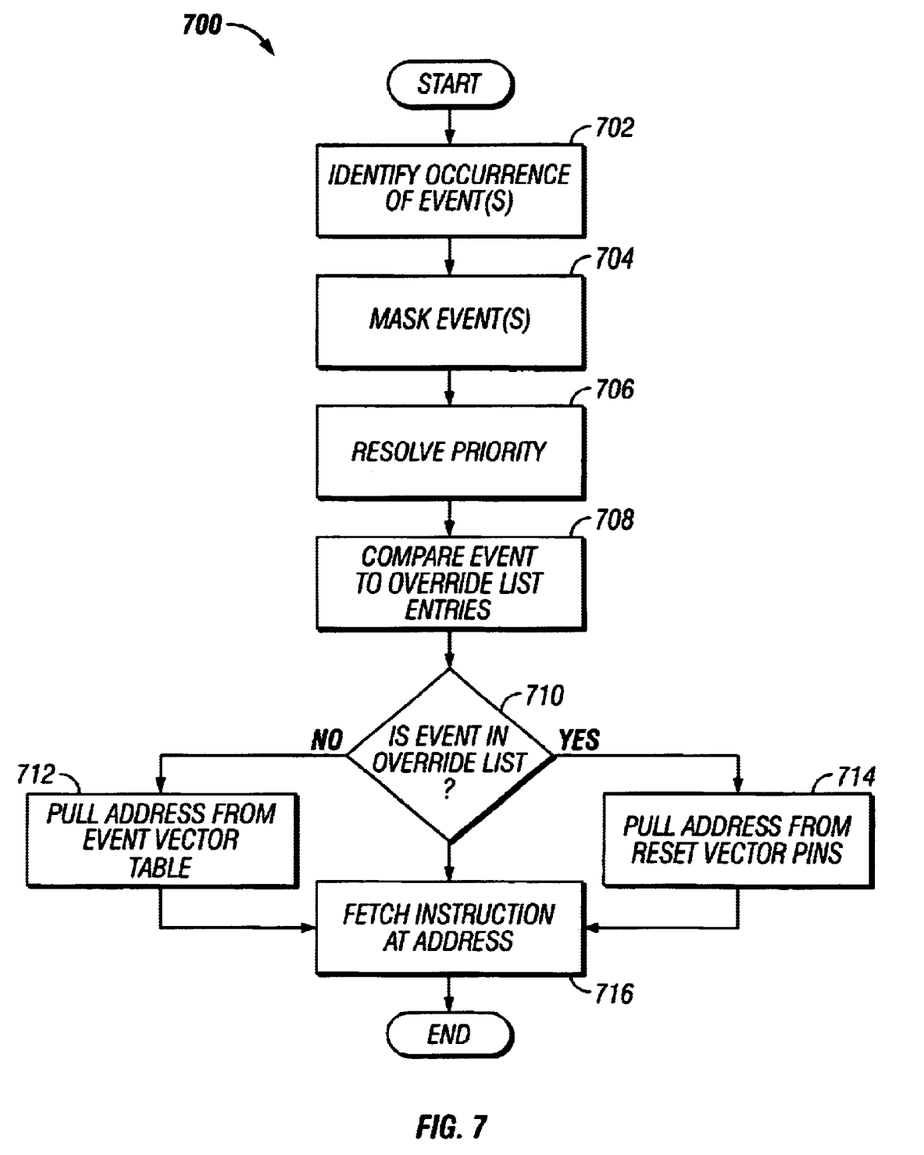
FIG. 7 is a flow chart describing an operation for overriding an event vector table according to an embodiment.

FIG. 7 illustrates a flowchart describing an operation 700 for overriding an EVT entry according to an embodiment. The following description is simply one embodiment of implementing the operation 700. In other embodiments, states may be skipped or performed in a different order. The operation is described using the circuit 600 of FIG. 6, however, the operation 700 may be performed using circuits according to alternate embodiments.

The n-bit event word output from the latch 606 may identify the occurrence of event(s) in a given cycle in state 702. The MPD circuit 604 may mask out certain events in state 704 and resolve priority between multiple events in state 706. The MPD circuit 604 may output the new orthogonal event word, i.e., having one or none of its bits set HIGH, to EVT MUX 608. The EVT MUX 608 may select the entry in the event vector table 610 that corresponds to the priority event identified by the new orthogonal event word. The new orthogonal event word may also be input to the AND gate 612. The AND gate 612 may produce an n-bit word from the bit-wise products of the new orthogonal event word from the MPD circuit 604 and the n-bit override word from the EVT override register 616 in state 708. The n-bit word output from the AND gate 614 may have a HIGH value in a bit location if the event number corresponding to that bit occurred in that cycle and the event number corresponds to an overloaded GPI. An OR gate 618 may produce a 1-bit sum from the sixteen bits in the word and output a single bit in state 710. The output bit may indicate whether the EVT entry should be overridden. This bit may be input to a MUX 620. The MUX 620 may select 32-bit the address at the EVT MUX 608 in state 712 if the bit output from the OR gate 618 has a LOW value. The MUX 620 may select a 32-bit instruction address supplied by the system controller 502 at the reset vector pins 614 in state 714 if the bit has a HIGH value. The selected address may be stored in a latch 622. This address may be used to fetch an instruction for the appropriate event service routine in state 716.

A number of embodiments of the invention have been described. Nevertheless, it will be understood that various modifications may be made without departing from the spirit and scope of the invention. For example, the widths of the event and override words and instruction address are not limited to those described above. Accordingly, other embodiments are within the scope of the following claims.

What is claimed is:

1. A method for overriding an event entry in an event vector table in a processor including a plurality of pins, comprising:

identifying an occurrence of an event;

comparing an event number corresponding to the event to one or more overloaded event numbers in the event vector table, each of said overloaded event numbers being associated with more than one event;

in response to the event number not matching at least one of the one or more overloaded event numbers, selecting a first address in an event entry corresponding to the event number from the event vector table; and in response to the event number matching at least one of the one or more overloaded event numbers, overriding the event entry corresponding to the event number in the event vector table by selecting a second address from the plurality of pins in the processor.

2. The method of claim 1, further comprising:

fetching a first instruction for an event service routine at the first address in response to selecting the first address; and fetching a first instruction for an event service routine at the second address in response to selecting the second address.

3. The method of claim 1, wherein said plurality of pins comprise reset vector pins.

4. The method of claim 1, wherein the event vector table includes sixteen event entries.

5. The method of claim 1, wherein the one or more overloaded event numbers correspond to one or more general purpose interrupts.

6. Apparatus, including instructions residing on a machine-readable medium, for overriding an event entry in an event vector table in a processor including a plurality of pins, said instructions causing the machine to:

identify an occurrence of an event;

compare an event number corresponding to the event to one or more overloaded event numbers in the event vector table, each of said overloaded event numbers being associated with more than one event;

in response to the event number not matching at least one of the one or more overloaded event numbers, select a first address in an event entry corresponding to the event number from the event vector table; and in response to the event number matching at least one of the one or more overloaded event numbers, override the event entry corresponding to the event number in the event vector table by selecting a second address from the plurality of pins.

7. The apparatus of claim 6, further comprising instructions causing the machine to:

fetch a first instruction for an event service routine at the first address in response to selecting the first address; and fetch a first instruction for an event service routine at the second address in response to selecting the second address.

8. The apparatus of claim 6, wherein said plurality of pins comprise reset vector pins.

9. The apparatus of claim 6, wherein the event vector table includes sixteen event entries.

10. The apparatus of claim 6, wherein the one or more overloaded event numbers correspond to one or more general purpose interrupts.

11. A processor comprising:
an event vector table including a plurality of entries, each entry including an address for an event service routine instruction corresponding to a particular event number;
a plurality of pins adapted to receive an address;
an override circuit to output an override signal in response to an input event number matching at least one overloaded event number, said overloaded event number being associated with a plurality of events; and
a selection circuit connected to the override circuit, the event vector table, and the plurality of pins, said selection circuit operative to select an address at the plurality of pins in response to the override signal.

12. The processor of claim 11, wherein the address at the plurality of pins comprises an address for a first instruction in an event service routine corresponding to an event having an overloaded event number.

13. The processor of claim 11, further comprising:
an override register to store the at least one overloaded event number.

14. The processor of claim 12, wherein the overloaded event number corresponds to a general purpose interrupt.

15. The processor of claim 13, wherein the override register is adapted to store a plurality of overloaded event numbers, and wherein the override circuit is adapted to compare the input event number to each of the plurality of overloaded event numbers.

16. The processor of claim 13, wherein the override register is adapted to output a first n-bit word identifying said at least one overloaded event number, and wherein the override circuit comprises:
an AND gate to generate a second n-bit word from the bit-wise products of the first n-bit word and an n-bit event word; and
an OR gate to generate the override signal from the sum of the bits in the second n-bit override word.

17. The processor of claim 11, wherein the plurality of pins comprise a plurality of reset vector pins.

18. The processor of claim 11, wherein the override register comprises a memory map register.

19. The processor of claim 11, wherein the selection circuit comprises a multiplexer.

20. A system comprising:
a system controller;
a plurality of devices connected to the system controller; and
a processor connected to the system controller, said processor comprising:
an event vector table including a plurality of entries, each entry including an address for an event service routine instruction corresponding to a particular event number;
a plurality of pins adapted to receive an address from the system controller;
an override circuit to output an override signal in response to an input event number matching at least one overloaded event number, said overloaded event number being associated with a plurality of events; and
a selection circuit connected to the override circuit, the event vector table, and the plurality of pins, said selection circuit operative to select an address at the plurality of pins in response to the override signal.

21. The system of claim 20, further comprising:
a device priority handler connected to the system controller, said device priority handler adapted to resolve priority between a plurality of devices having the same event number.

22. The system of claim 20, further comprising:
an override register to store at least one overloaded event number.

23. The apparatus of claim 20, wherein the address from the system controller at the plurality of pins comprises a first address for an event service routine corresponding to an event having an overloaded event number.

24. A system comprising:
a static random access memory; and
a processor coupled to the static random access memory, said processor including:
an event vector table including a plurality of event entries, each entry being associated with an event and including an address;
a plurality of pins;
an event vector table override circuit to output an override signal in response to an input event number matching at least one overloaded event number, said overloaded event number being associated with a plurality of events; and
a selection circuit connected to the override circuit, the event vector table, and the plurality of pins, said selection circuit operative to select an address at the plurality of pins in response to the override signal.

25. A method comprising:
identifying an occurrence of an event;
comparing an event number corresponding to the event to one or more overloaded event numbers, each of said overloaded event numbers being associated with more than one event;
in response to the event number not matching at least one of the one or more overloaded event numbers, selecting a first address in an event entry corresponding the event number from an event vector table; and
in response to the event number matching at least one of the one or more overloaded event numbers, selecting a second address supplied by a controller.

26. An apparatus comprising:
a controller operative to supply an address for a first instruction in an event service routine corresponding to an event having an overloaded event number, said overloaded event number being associated with a plurality of events;
a processor connected to the controller, said processor comprising:
an event vector table including a plurality of entries, each entry including an address for an event service routine instruction corresponding to a particular event number;
an override circuit to output an override signal in response to an input event number matching the overloaded event number; and
a selection circuit connected to the override circuit, said selection circuit operative to select the address supplied by the controller in response to the override signal.

27. The apparatus of claim 26, wherein the selection circuit is operative to select an address in an entry in the event vector table in response to not receiving the override signal.

* * * * *